United States Patent [19]

Muller

[11] Patent Number: 4,641,549

[45] Date of Patent: Feb. 10, 1987

[54] MULTIPLE STAGE GEARBOX SHIFTABLE UNDER LOAD

[75] Inventor: Helmut Muller, Heidenheim, Fed. Rep. of Germany

[73] Assignee: J. M. Voith GmbH, Fed. Rep. of Germany

[21] Appl. No.: 725,417

[22] Filed: Apr. 22, 1985

[30] Foreign Application Priority Data

Apr. 28, 1984 [DE] Fed. Rep. of Germany ....... 3415909

[51] Int. Cl.$^4$ ............................................ F16H 47/00
[52] U.S. Cl. ......................................... 74/732; 74/720
[58] Field of Search ................. 74/861, 731, 732, 733, 74/720, 688; 192/3.21, 0.075, 0.076, 0.07, 103 R

[56] References Cited

U.S. PATENT DOCUMENTS

| | | | |
|---|---|---|---|
| 2,397,634 | 4/1946 | Voytech | 74/732 X |
| 3,065,653 | 11/1962 | Suri | 74/720 |
| 3,176,544 | 4/1965 | Baumeister | 74/732 |
| 3,555,931 | 1/1971 | Polzer | 74/720 X |
| 3,671,814 | 6/1972 | Dick | 317/123 |
| 3,683,719 | 8/1972 | Gros | 74/720 X |
| 3,749,209 | 7/1973 | Weinrich et al. | 74/688 X |
| 4,041,809 | 8/1977 | Dick et al. | 74/866 |
| 4,169,414 | 10/1979 | Muller | 105/61 |
| 4,391,096 | 7/1983 | Polzer et al. | 74/732 X |
| 4,471,670 | 9/1984 | Müller | 74/732 X |

FOREIGN PATENT DOCUMENTS

| | | | |
|---|---|---|---|
| 667073 | 7/1963 | Canada | 74/732 |
| 0085498 | 1/1983 | European Pat. Off. | |
| 697522 | 9/1940 | Fed. Rep. of Germany | |
| 739638 | 8/1943 | Fed. Rep. of Germany | |
| 881003 | 5/1953 | Fed. Rep. of Germany | |
| 887663 | 7/1953 | Fed. Rep. of Germany | 74/732 |
| 958081 | 1/1957 | Fed. Rep. of Germany | |
| 076461 | 2/1960 | Fed. Rep. of Germany | |
| 1246010 | 8/1967 | Fed. Rep. of Germany | |
| 3217950 | 11/1983 | Fed. Rep. of Germany | |
| 3211337 | 8/1984 | Fed. Rep. of Germany | |
| 296104 | 1/1954 | Switzerland | 74/732 |
| 308205 | 6/1955 | Switzerland | 74/732 |
| 1208831 | 10/1970 | United Kingdom | 74/688 |

Primary Examiner—Leslie Braun
Assistant Examiner—Dirk Wright
Attorney, Agent, or Firm—Jeffers, Irish & Hoffman

[57] ABSTRACT

A change spur gear of reducer unit design features two paths of force. The first path of force comprises a unit which provides gearing to high speed, a hydrodynamic torque converter and, following it, a multiple shift gear. The second path of force comprises as well a unit which provides gearing to high speed, on the high speed shaft of which there is a hydrodynamic servoclutch arranged. The secondary vane wheel connects through appropriate reducers with the transmission output. In shifting from one gear to another, the servoclutch is filled first, then the respective shift detent is disengaged under no load, the servoclutch is adjusted to the slip corresponding with the next gear thereby enabling a no-load shifting of the detent of the next gear. Upon emptying of the servoclutch, the engine moment is again assumed by the first path of force without any interruption of the traction force.

13 Claims, 5 Drawing Figures

| GEAR | TORQUE CONVERTER | GEAR ACTUATOR | | | |
|---|---|---|---|---|---|
| | | 115 | 120 | 125 | 159 |
| 1 | ENGAGED | ↕ ○ | ○ | ○ | ○ |
| 2 | DISENGAGED | ↕ ○ | ↑ ○ | ○ | ○ |
| 3 | DISENGAGED | ○ ↓ | ↑ ○ | ○ | ○ |
| 4 | DISENGAGED | ○ | ↑ ○ | ↑ ○ | ○ |
| REVERSE | ENGAGED | ○ | ○ | ○ | ○ ↓ |

○ NEUTRAL POSITION
○—→○ DIRECTION OF MOVEMENT

Fig. 5

MULTIPLE STAGE GEARBOX SHIFTABLE UNDER LOAD

BACKGROUND OF THE INVENTION

The invention is directed to a change spur gear for vehicles in layshaft design with a starting member, a main shaft train and two layshafts, and which can be shifted under power.

Automotive transmissions of that type employ primarily synchronizing devices for shifting such as previously known, e.g., from the German Offenlegungsschrift No. 32 17 950 and consisting of a sliding sleeve which prior to engaging the mating component forces a synchronization of the two components to be coupled, through a friction cone clutch. For that purpose, however, the flow of force from the engine is interrupted, the shifting occurs essentially at no power, and only the participating rotating transmission masses need to be accelerated or retarded accordingly by means of the synchronizing device.

The invention is based on a transmission previously known from the German Patentschrift No. 958 081 which as a starting member features a friction clutch followed by a spur gearing which is comprised of the main shaft and a layshaft. In addition a synchronizing device is arranged on a second layshaft, which is also called an auxiliary shaft. The operational flow of force proceeds through the gear wheels and the shift detents, which are on the main shaft and one of the layshafts, are in mesh in the various gears. Arranged on the second layshaft are further gear wheels and shift detents which are effective only during the gear shift phase. For that purpose, a gear change is prepared by forcing sliding sleeves equipped with deflecting detents axially onto respective mating detents. The gear change itself takes place through friction clutch release whereby a rotational speed adaptation of the detents to be shifted, to the next gear, occurs on the second layshaft through the synchronizing device. While the engagement of the detents occurs in the absence of power, it takes place under axial pressure as long as an inequality of speed exists and the end faces of the detents run on one another in ratchet fashion.

A similar transmission is previously known from the German Patentschrift No. 697 552. The flow of force occurs there also by way of gear wheels on the main shaft, the layshaft and through sliding shift sleeves. A friction synchronizing clutch is capable of effecting engagement synchronization of the shifting sleeves by connecting the main shaft with the transmission output shaft or by braking on a casing-fixed braking surface. The engagement itself occurs again at no power and with the friction main clutch released. Also known is a transmission design (German Pat. Nos. 739,638 and 881,003) where the friction main clutch is bridged by a shiftable clutch which is supposed to effect synchronization directly through the layshaft of the transmission. The transmission designs mentioned above do not represent a power shift gear with uninterrupted gear shifting.

Another design of a change spur gear in layshaft design is shown by German Auslegeschrift No. 1 076 461. It teaches as a starting element a torque converter which is followed by two or more gears stages which are shifted and/or synchronized by multiple disk and/or friction clutches.

The synchronizing device designs described above have the drawback that there are always friction bodies, that is, multiple disks, friction cones or ratchet type detents, that participate in the shifting operations. These detents are subject to heat buildup, wear and increased risk of breakage with the result of susceptibility to malfunction and repair, reduced service life and short lubricating oil life, especially when the main clutch is designed as a friction clutch.

These disadvantages are partly counteracted by a transmission design known from the German Pat. No. 1 246 010 where a mechanical multi-step reduction gear is driven by two torque converters and the synchronization takes place either through filling and emptying of the converters or through an integrated hydrodynamic brake. But the deflection detents are always in a ratchet mode as long as the synchronization process is not completed. While they operate satisfactorily, the hydromechanical transmission of the above design or other non-wearing fully hydraulic transmissions are afflicted with the disadvantage that the force of flow occurs in all gear stages through a hydrodynamic circuit, i.e., through a torque converter or a fluid clutch. The efficiency of the transmission is considerably lower than with strictly mechanical automotive transmissions, especially outside the starting range.

The problem to which the invention is directed is to provide a shift gear which is shiftable under power and without traction force interruption, which transmission combines great reliability, absence of wear of the components participating in the shifting operations, good efficiency, and low design expense. Further, the transmission should be capable of being equipped with various numbers of gears and to permit automatic shifting.

SUMMARY OF THE INVENTION

The problems associated with earlier devices are solved through the present invention. The present invention is directed to a transmission and spur gear/reducer unit design which features two paths of force which originate directly from the transmission input shaft and from two gearing units, on two layshafts, which provide gearing to high speed. The first path of force features a starting element designed as a hydrodynamic flow circuit, preferably a torque converter, whose pump wheel is driven directly by the first layshaft and whose turbine wheel drives the actual layshaft of the shift gear. From this shaft, the torque is passed through the shift detents to the individual gear stages and to the transmission output shaft. The second path of force comprises a hydrodynamic servoclutch whose primary vane wheel is powered by the second layshaft and whose secondary vane wheel is connected with the transmission output shaft through a gearing unit which provides gearing to an output speed which is higher than the fastest gear stage. The first path of flow transmits the torque during travel in all gears, including the starting phase, while the second path of force is active only during the shifting process including synchronization.

During this synchronizing process the servoclutch transmits, through controlled filling, the torque from the engine directly to the output shaft. The servoclutch is for that purpose so designed that it will demand from the engine a torque greater than transmitted previously, so that the force transmission to the transmission output shaft will take place through the second path of force. At the same time, the shift detent momentarily engaged in the first path of force is relieved and may be disengaged at almost no load, for instance by spring force, while the servoclutch, through an extremely quickly responding slip adjustment in its fluid circuit, causes between the output and the input shaft a speed ratio which is identical with the gearing ratio of the next gear to be shifted. As soon as the set value of slip is reached which is typical for the respective gear, virtual synchronism exists between the detents of the transmission components which are to be connected. Thus, the shift detent can engage in the absence of power and, thereafter, the synchronizing servoclutch can be emptied. This latter process causes the engine power to alternate over to the first path of force in the newly shifted gear stage.

The engine has during the shifting process not been subjected to any load change by the operator or through an automatic control. Instead, the servoclutch has caused the relief of the first path of force, relieving the engine and/or changing its speed of rotation to a degree such that upon completed slip regulation exactly the engine speed corresponding with the newly shifted gear prevails in the servoclutch. When shifting down to a lower gear stage, appropriate slip control in the clutch subjects the engine, without external intervention, first to a load such that the engaged shift detent will disengage under no load. Upon disengagement, the clutch again relieves the engine in a way such that, again through slip control, it will assume a speed of rotation which relative to the momentary output speed corresponds exactly with the set value for the next lower gear, which is to be engaged next. Again, under no load, the respective shift detent can be engaged and the servoclutch can release the force of flow through the first path of force as it empties subsequently.

Thus, the drive drain of the vehicle remains during shifting always in torque connection with the engine, and a no-load condition never occurs. Synchronization is not accomplished only through relieving the shift detents, for instance, by reducing the engine torque and forced braking of the participating transmission masses, but through exact adjustment of the speed of rotation of all transmission components to the required set value, which mechanically, with friction components, is hardly possible, especially not without wear. As a result, the engine runs after synchronization already at exactly the speed for the next gear. The changeover of the power, both from the first path of force to the second while the clutch is filling up and vice versa as it empties, occurs practically without impact and without wear. The slight impact occurring as the detents engage at a low speed differential is rendered meaningless through an elastic design of one transmission shaft.

Further advantages are achieved with the novel transmission arrangement of the invention. For example, using a fillable and emptiable torque converter as starting member ensures a smooth and swift start, and no problems of heat buildup or wear occur which depend on the duration or frequency of the starting process. The gear stage following the converter operation may be fashioned as a converter through-clutch in that the primary gear and secondary gear of the hydrodynamic circuit are bridged by a clutch. That is, the pump wheel and the turbine wheel are arranged so that they may be connected by means of a shaft detent, synchronization is accomplished in the same manner as described for the other gear stages. The converter empties upon completed coupling. Only a single synchronizing device is required for the transmission, and the arrangement is suited for transmissions with any number of gears. If the highest speed gear is not designed as a direct gear with coaxial arrangement of the transmission input and output shafts but as overdrive, shifting to this gear stage is possible as well with the novel synchronization feature. For that purpose it is necessary to make sure that the upward gearing unit to the second layshaft is geared sufficiently high for the servoclutch to still have a sufficiently high slip after synchronization of the shift detents for this gear stage so that the engine speed can be retarded. The minimum slip in the clutch is in the order of 10%. The high specific output and quick response of the servoclutch is due to the high speed of rotation, the slanted vanes of the wheels, and the very large influx and discharge cross-sections for the working fluid. By employing a prior pressure control in the fluid circuit of the servoclutch, the charging and adjusting to the slip which is preset by a control occurs so fast that the entire shifting requires only one to two seconds. The slip losses which temporarily occur in the process are thus insignificant as regards the efficiency of the transmission. In the upshifting, which is important in terms of operating dynamics, a mass torque becomes additionally effective through the engine mass itself due to the quick reduction of the engine speed causing an increase of the traction force. As a torque converter for starting a type such can be used which is in action only briefly and permits already after a short acceleration a shifting into a strictly mechanical gear stage. The novel transmission of the invention has in all other operating ranges the high efficiency of strictly mechanical transmissions, but utilizes the absence of wear and temperature insensitivity of hydrodynamic elements for brief load change processes which occur without straining the engine and the vehicle.

The novel transmission of the invention can also be equipped with a hydrodynamic flow brake (retarder) whose rotor may be mounted, for instance, on the secondary wheel shaft of the servoclutch which constantly rotates together with the output shaft of the transmission. The inventional transmission permits braking with the aid of the engine, since it is always positively connected with the drive axles, except for the converter operation, also during the synchronizing process.

The control for triggering gear changes utilizes signals which are obtained through speed sensors for the transmission input and output speeds. Depending on engine characteristics and applicable operating conditions (e.g. minimum fuel consumption, minimum emission, maximum acceleration), the shifting can also be controlled. For instance, the shift operation is triggered as soon as a specific value of input speed exists, and the shifting then involves the initially described steps. In the process, the two rotational speeds are compared and the quotient from output speed versus input speed is derived. This ratio forms the basis for the manipulated variable which influences the slip in the servoclutch. An overflow valve which is adjustable to various response pressures is pressurized for that purpose. The transmission controller may be of a hydraulic, pneumatic, or preferably electronic design. It may also receive further signals for the momentary engine output so that the shifting, for instance at an elevated engine power demand, will occur also at a higher absolute speed of rotation. The controller can be automated, and the presence of mechanical elements for engaging the shift detents enables emergency shifting intervention, for instance of the converter gear in conjunction with a gear wheel stage in case of controller malfunction.

The shift detents may be beveled on their end face in both peripheral directions for it was recognized that a safe and dependable meshing is possible even at a variation of up to 5% from the absolute synchronism and appropriate shaping of the end faces of the detents. The slip control for the servoclutch and the signal processing of the controller may feature an appropriate tolerance. If the speed differential exceeds a specific value, the controller will not prompt a forced meshing of the detents in the event of a shifting malfunction, but the detents will slide across due to the deflection effect of the detent and faces which acts in both directions.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings.

FIG. 5 is a tabular presentation of the elements actuated in the respective gear stages.

DETAILED DESCRIPTION

Figure 1:
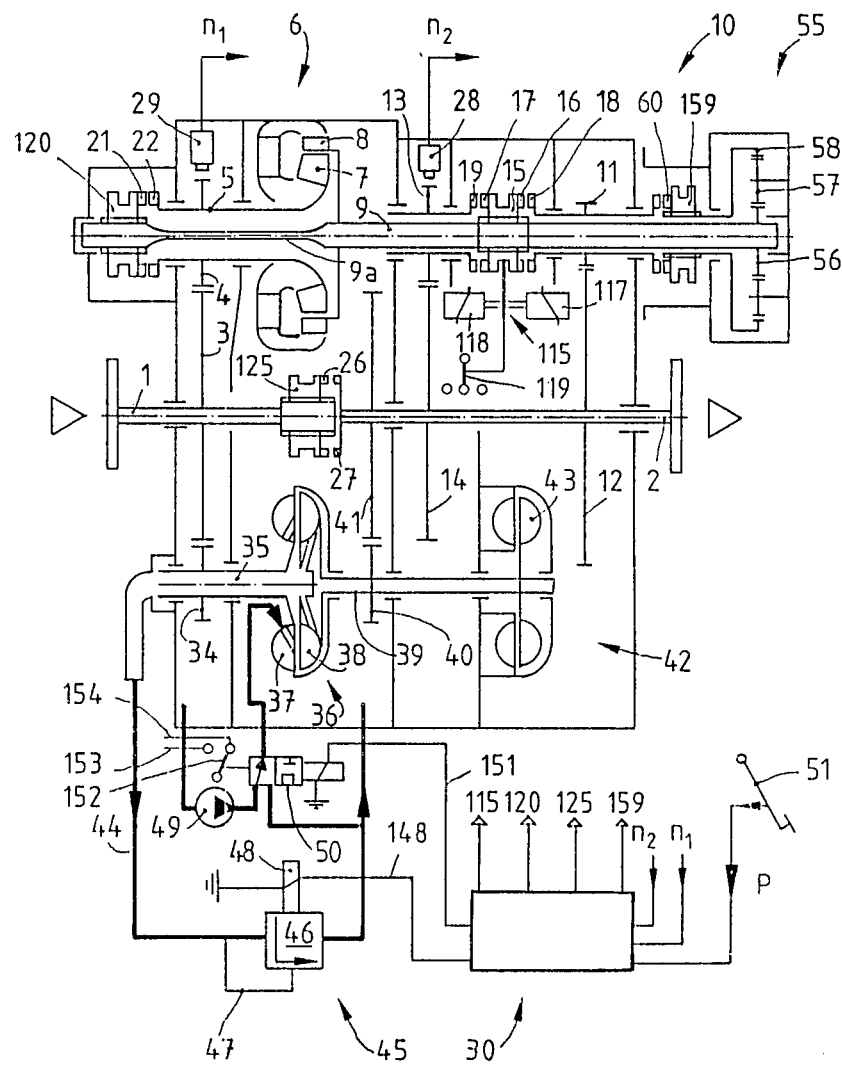
FIG. 1 schematically illustrates a power shift gear in 4-speed design and a hydrodynamic brake.

Referring to FIG. 1, there is a transmission with an input shaft 1 and, mounted on it, a gear wheel 3 driving a pinion 4. Gear wheel 3 and pinion 4 form a gearing unit providing high speed gearing for driving a first layshaft 5. This layshaft 5 is designed as a hollow shaft and represents likewise the primary shaft for the pump wheel 7 of a starting element which is fashioned as a torque converter generally designated as 6 and whose turbine wheel 8 is mounted on a secondary shaft 9. Toward one end, the shaft 9 extends through the layshaft 5 and continues toward the other end as a power shaft for the shift gear 10. The latter comprises two pinions 11 and 13 which are mounted independently from each other and mesh with corresponding mating gears 12 and 14. These gears 12 and 14 are permanently mounted on a drive shaft 2 and form together with the corresponding pinions 11 and 13 two shiftable gear stages. The pinions 11 and 13 feature for that purpose shift detents 18, 19 on facing end faces. The torque is introduced in customary fashion by way of a sliding sleeve 15 which is shiftably arranged on the secondary shaft 9 and features as well, on its end, shift detents which can be brought in mesh either with those of the pinion 11 or of the pinion 13. An intermediate, nonmeshing position is located between the two positions.

A further sliding sleeve 20 is arranged on the part of the secondary shaft 9 which extends through the layshaft 5, and it is provided on its end faces with shift detents 21 which can be caused to mesh with corresponding detents 22 on the end of the layshaft 5. The sliding sleeve 20 represents a bridging clutch for the pump wheel 7 and the turbine wheel 8 of the torque converter 6.

A third sliding sleeve 25 with shift detents 26 is located on the extension of the input shaft 1. The output shaft 2 is arranged coaxially with an input shaft 1 and features shift detents 27 for meshing with the sliding sleeve 25. This shift condition represents then the direct gear of the transmission.

The sliding sleeves 15, 20, 25 can be operated via a shifting device 115 which is previously known from the European Patent Application No. A1 0 085 498. As an example, this shifting device 115 is illustrated only for axially shifting the sliding sleeve 15. The axial shifting of the sleeve 15 can be caused either through pressurized pistons or solenoids 117, 118. A switch 119 indicating the possible positions of the sliding sleeve 15 is connected with the shifting device 115. The other sliding sleeves 20, 25, 59 are actuated in corresponding fashion as well through shifting devices 120, 125, 159 (not illustrated).

The gear wheel 3 arranged on the input shaft 1 is additionally in mesh with another pinion 34 which is mounted on a second layshaft 35. Arranged on the layshaft 35 is the primary vane wheel 37 of a fluid clutch (servoclutch) with a controllable degree of filling. The secondary vane wheel 38 is mounted on an intermediate shaft 39 supporting a pinion 40. The pinion 40 meshes with a gear wheel 41 which is connected with the output shaft 2. In the present embodiment, the rotor 43 of a hydrodynamic brake 42 is additionally arranged on the intermediate shaft 39. Through the gear set 40, 41, this brake 42 is thus permanently connected with the output shaft 2, independent of the gear.

The shifting steps in the transmission proceed as set out below.

In gear I, the sliding sleeve 15 with detents 16, 18 is connected with the pinion 11. The starting process is initiated through filling the torque converter 6 with working fluid so that the flow of force proceeds from the transmission input shaft 1 through the up-gearing unit 3, 4 to the vane wheels 7, 8 of the secondary shaft 9 and through the wheels 11, 12 to the output shaft 2. Once the converter 6 has cycled through the operating range assigned to it, a speed emitter 28 monitoring the speed of the output shaft 2 emits a signal for shifting to gear II. The shifting takes place through emptying the converter 6 and engaging the converter bridging clutch, namely the sliding sleeve 20 with detents 21, with the detents 22 of the first layshaft 5. The necessary synchronism between the layshaft 5 and the secondary shaft 9 is attained as follows:

The signal originating from the speed emitter 28 causes through a controller 30 the filling of the servoclutch 36. The filling operation is very quick because the gearing of gear wheels 3, 34 is so selected that the clutch will rotate at high speed and permits thus small dimensions. The output shaft 2, and with it the gear set 40, 41, in comparison, rotate relatively slowly and cause a high slip in the servoclutch. The clutch 36 features preferably slanted vanes giving it a high specific efficiency (k-value), that is, a high torque at a given speed of rotation. This torque may exceed the useful engine torque by about 50% causing the flow of force from the transmission input shaft 1 to the output shaft 2 to be assumed now by the clutch at simultaneous relief of the shafts 5 and 9 along with the participating gear wheels. But since the input shaft 1 is directly connected with the output shaft 2 through the servoclutch 36, an engine speed suppression occurs of necessity due to the gearing ratio of the gear wheel pairs 3, 34 and 40, 41. A speed of rotation proportional to the engine speed is measured by a second speed emitter 29 on the input end of the transmission. The two speed emitters 28, 29 now enable a comparison, so that a fixed value for the ratio of output speed $n_2$ to input speed $n_1$ can be coordinated with each gear stage.

While a continuous start occurs in gear I through the torque converter 6, a speed ratio fixed by the gear pairs 3, 4 and 11, 12 exists upon bridging of the converter. Utilizing a pressure controller known from the German Patentschrift No. 3 211 337, the filling degree of the servoclutch 36 is now so changed, through a signal originating from the controller 30, that the set value for the ratio $n_2/n_1$ for the newly shifted gear II is obtained by means of precisely adjusted slip in the clutch 36. This is because synchronism prevails then between the shafts 5 and 9 coupled by the sliding sleeve 20. Consequently, as soon as the value $n_2/n_1$ indicated by the two speed emitters 28, 29 corresponds with the set value $n_2/n_1$ for gear II, the shift of the sleeve 20 is initiated through the controller 30. When the limit position is reached, the servoclutch 36 is emptied permitting the flow of force through the second layshaft 35 to recede and build up again through the first layshaft 5. The torque is then transmitted again through the shaft 9 but, in this gear II and the following gears, through the shaft section located between the sliding sleeve 20 and the turbine wheel 8 between the hollow layshaft 5.

The servoclutch empties quickly, the same as it fills, and the torque increase in the shaft 9 is correspondingly swift. Although the shifting occurs smoothly and without impact, the shaft 9 is favorably designed as an elastic shaft producing through tapering in specific shaft areas a rotational elasticity for a smooth shifting that spares the transmission.

For shifting from gear II to gear III the sleeve 15 is shifted in the other limit position, incorporating the gear pair 13, 14 into the force of flow through the shift detents 17, 19. If one of the speed emitters 28, 29 signals the set value $n_2$ or $n_1$ for shifting to gear III, the synchronization through the servoclutch proceeds again as follows: filling the clutch 36 and concomitantly relieving the detents 16, 18 and causing the sleeve 15 to disengage by spring force into center position, slip adjustment in the servoclutch to the new set value $n_2/n_1$ for gear III, engaging the sleeve 15 with detents 17, 19 and emptying the servoclutch 36.

When shifting to gear IV, the sliding sleeve 15 is shifted to center position while the sleeve 25 is shifted after synchronization as described, so that the detents 26, 27 will mesh and produce the direct gear from the input shaft 1 to the output shaft 2.

To safeguard a safe and swift synchronization when shifting to the gear with the highest output speed, the gearing of the gear pair 3, 34 and 40, 41 is so chosen that the path of force will cause, through the second layshaft 35 and the servoclutch 36, a maximum speed and/or transmission output speed ranging between 5 and 15% above that of the fastest transmission gear stage. This means that the servoclutch 36 has a slip between 5 and 15% up to the end of the synchronizing process, when shifting into the fastest gear. The k-value of the clutch must be amply high to develop a sufficient torque for retarding the engine to the required synchronizing speed.

The slip in the servoclutch 36 is adjusted by the pressure controller 45. The secondary vane wheel 38 features for that purpose bores which tangentially originate from the inside periphery while being directed radially inward. They empty into the hollow layshaft 35. This hollow space leads through a line 44 to an overflow valve 46 whose movable valve body is pressurized by the pressure discharging from the secondary vane wheel 38, and at that, in "opening" direction, which symbolically is presented by a control line 47. The working fluid discharging from the overflow valve is routed back to the fluid reservoir. The servoclutch 36 is filled through a pump 49 which is powered by the input shaft 1 and through an influx valve 50 controlled by the controller 30, and the filling is directed into the interior of the clutch, for instance, through the vanes of the primary vane wheel.

The response of the overflow valve 46, and thus the servoclutch 36 degree of filling which governs the slip, is influenced by prestressing of the valve body in the overflow valve 46 in the "closing" direction. If the valve body is subjected to a low prestress, the clutch 36 will be able to sufficiently empty already at high slip values and low internal pressure, whereas the clutch 36 reaches at high prestress a greater degree of filling, develops a greater torque and achieves lower slip values. If the prestress is applied by a variable-force solenoid 48, a specific operating condition of the servoclutch 36 can be adjusted through appropriate excitation. This makes it possible to set for the servoclutch 36 a fixed slip value for synchronization which is determined by the controller 30 from the values $n_1$, $n_2$ originating from the speed emitters 28, 29 and passed as an appropriate signal to the solenoid 48 on the overflow valve 46.

In addition, the controller 30 enables influencing the shift point from one gear to another in such a way that at a high momentary power demand the shifting will take place at an operating speed and/or transmission input speed higher than it is at a low power demand. In the specific embodiment, the momentary power demand is derived from the position of the gas pedal 51.

In reverse gear, as illustrated in FIG. 1, a reverse reducer unit 55 may be provided which is powered by the secondary shaft 9 driving the gear pair 11, 12 in reverse direction. The reducer unit may be designed as a planetary gear with a driven sun gear 56, fixed planetary gears 57 and hollow gear 58, shifted in standstill through a sliding sleeve 59 and detents 60. The drive occurs then through a torque converter 6 with disengaged sliding sleeve 20. Instead of the reverse reducer unit 55, the transmission may also be equipped with a changeable reducer unit designed to follow the output shaft 2 (not illustrated). When using the transmission for instance in rail vehicles, all transmission gears are then available in both directions of travel. Both a reversing reducer unit 55 and a changeable reversing unit may be designed for flanged mounting for selective outfitting of the basic transmission. The arrangement of sliding sleeves 15, 20 illustrated in FIG. 1, on the highspeed shaft of the transmission 10, offers the advantage that the shift detents may be dimensioned for lower torques and the actuating devices for the sliding sleeves may favorably be installed in the transmission.

The hydrodynamic circuits of the transmission, i.e., the torque converter 6, servoclutch 36, and the retarder 42, are operative only for fractions of the operating time. As known, they are thus provided with devices which in empty condition prevent a power-consuming air circulation, for instance with aperture slides or other flow restricters (not illustrated).

It has been found that a dependable meshing of the shift detents is ensured not really at absolute synchronism of the sliding sleeve to be coupled and the other transmission element, but when a slight speed differential prevails. Therefore, the controller can be designed for a synchronizing tolerance of about 2% where the relative speed of the transmission elements to be coupled may amount to approximately 50 rpm without having to fear any damage to the unstressed shift detents.

Figure 2:
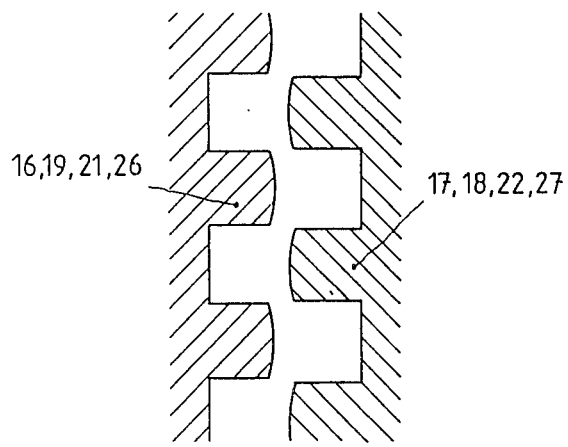
FIG. 2 illustrates a specific embodiment of the end faces of the shift detents.

But it is advantageous to give the end faces of the shift detents a crowned or beveled design in both peripheral directions as illustrated in FIG. 2. If a malfunction in the controller should cause an excessive speed differential at which the shift detents could not mesh without damage and impact, contact of the respective end faces of the shift detents will produce a deflecting effect which prevents a faulty shifting. A speed differential of even 5% may still cause the shift detents to mesh without damage, if the resulting impact is dissipated by designing the secondary shaft 9 as an elastic shaft.

Figure 3:
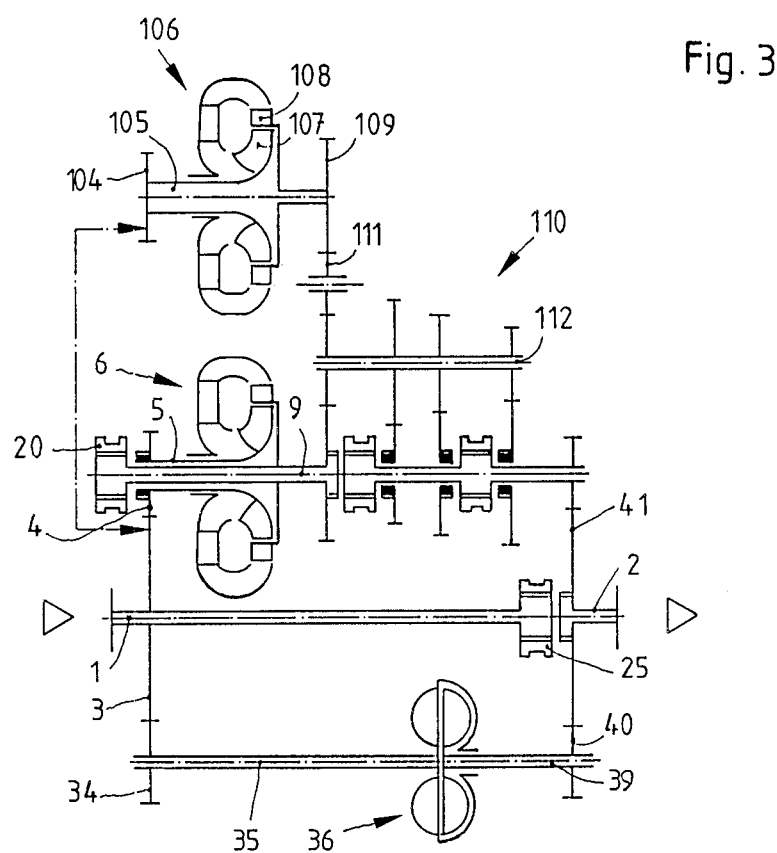
FIG. 3 schematically illustrates a power shift gear in 6-speed design with forward and rear converter.

FIG. 3 shows another embodiment for a transmission using the inventional shift device. For those elements that are the same as in FIG. 1, the same reference numbers are used. In FIG. 3 there is a transmission featuring six speeds, namely a torque converter 6 for starting that is driven by the up-gearing unit 3, 4 gear stages within a shift gear 110 with the torque converter 6 bridged, and a direct gear through the sliding sleeve 25. The shift gear 110 features four gear wheel pairs which are effective through appropriate sliding sleeves. The sliding sleeve 20 serves again to bridge the converter and is not in mesh only in the converter gear.

The transmission also features a second layshaft 35 driven by the gear wheel 34 supporting the servoclutch 36. The intermediate shaft 39 drives the output shaft 2 through the gear wheels 40, 41.

Instead of the reverse gear or changeable gear, another torque converter 106 is provided for reverse operation whose pump wheel 107 is driven by the up-gearing wheel 3 through the intermediary of the pinion 104. The turbine wheel 108 drives the reducer unit 112 of the shift gear 110 via the gear wheel 109 and the intermediate gear wheel 111. In this transmission design there is a combined hydrodynamic change and shift gear which combines all known advantages of a transmission with separate torque converters for each direction of travel (quick change of travel direction) and economical operation with strictly mechanical, nonwearing stepped gear which can be shifted under load. Since the converter for the reverse travel direction can customarily be employed for braking, a retarder is not required in this transmission design. Not illustrated in the control device for the servoclutch which is fashioned analogous to the design according to FIG. 1.

Figure 4:
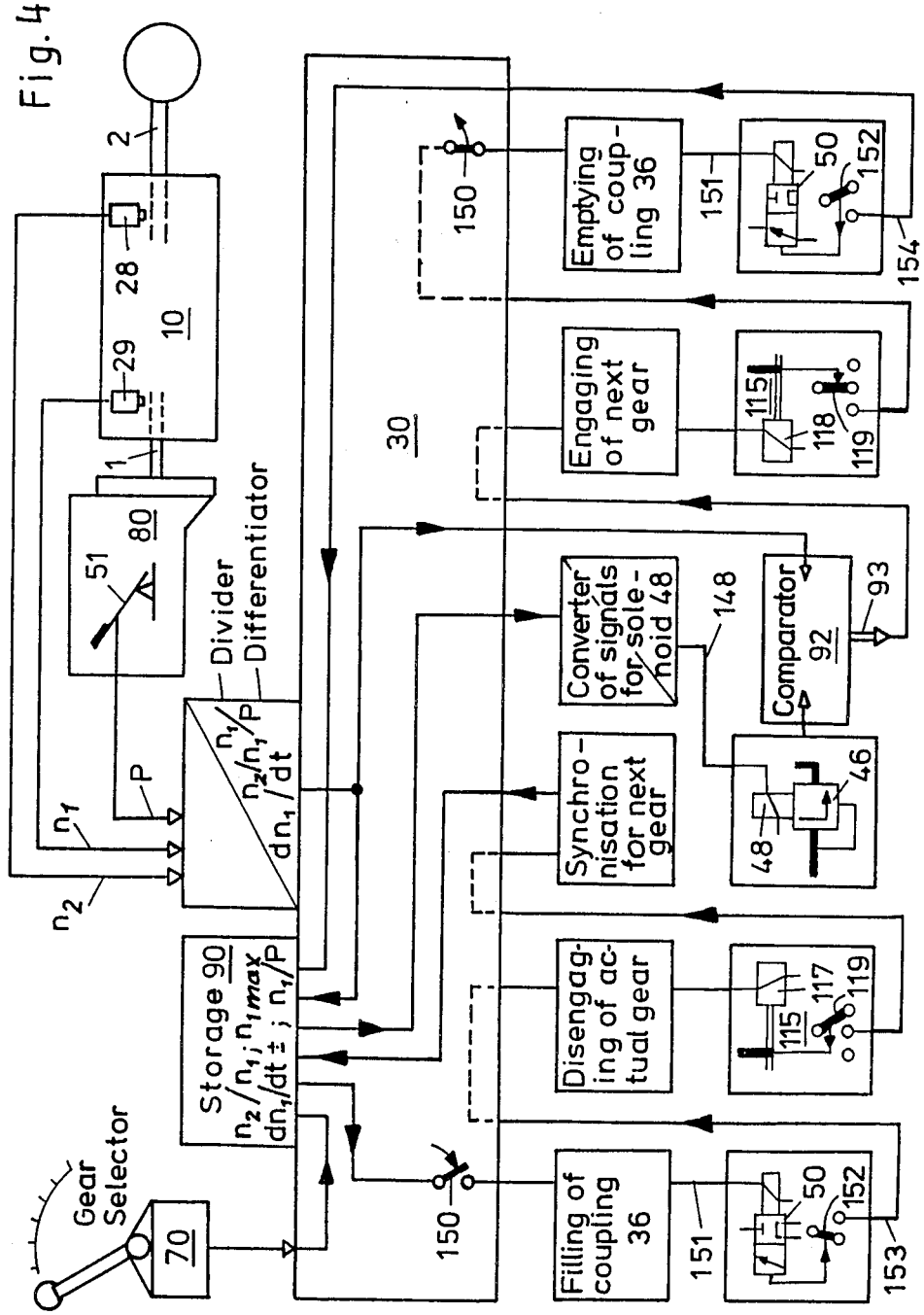
FIG. 4 illustrates the basic design of a transmission controller in simplified illustration.

FIG. 4 illustrates a specific embodiment of a transmission control in a simplified basic fashion. The signals enter the controller 30 from a gear selector 70 used by the operator for preselecting the desired travel program. Further, the controller 30 receives from the transmission 10 through the sensors 28, 29 signals relating to the input and output speeds $n_1$ and $n_2$ and, from the engine 80 and/or the gas pedal 51, a signal relating to the momentary power P. These input data for the rotational speeds $n_1$ and $n_2$ are converted to the quotients $n_2/n_1$ which are representative for selecting the gear stages. There is also formed the magnitude $dn_2/dt$, which is a value for accelerating the vehicle by means of the output speed $n_2$ which is proportional to the speed. There is additionally formed the quotient $n_1/P$ that effects a contingency of the shifting point upon the momentary engine power.

In addition, the controller 30 comprises a memory 90 in which for each gear stage the pertaining value $n_2/n_1$ is stored, additionally fixed values for the quotients $n_1/P$, and the maximum value for $n_1$. The purpose of forming the magnitude $dn_2/dt$ is to provide an indication whether the vehicle is presently being accelerated (positive signal) or retarded (negative signal). Accordingly, the memory provides for the appropriate shifting step the quotients $n_2/n_1$ for the next higher or next lower gear.

Described hereafter, as an example, is the sequence of shifting from the second to the third gear in a transmission according to FIG. 1, with detailed explanation of the participating control elements, under participation of the components listed in tabular form in FIG. 5. Shifting from one gear to another occurs as the speed of rotation $n_1$ approaches its maximum, the ratio $n_1/P$ has reached its minimum, and the vehicle is in an accelerating phase (quotient $dn_2/dt$ is positive). The interaction of the data obtained from the memory and the sensors may take place in the fashion known from the U.S. Pat. Nos. 4,169,414 and 4,041,809. If the above conditions exist for a shifting, a switch 150 will close and cause the following program sequence:

Step A: "Filling the servoclutch 36." The influx valve 50 is opened through the line 151, and a limit switch 152 connected with it feeds the line 153 triggering Step B: "Disengagement of detents 16, 18, sleeve 15 in center position." The sleeve 15 is shifted into center position through magnet 117, and the center position is indicated by the limit switch 119. This causes Step C: "Adjusting the servoclutch to a predetermined slip." This slip must correspond with the value $n_2/n_1$ of the next gear to be shifted. Next, a value is called from memory 90 and passed on to the converter 91 which converts the signal to an electrical magnitude which controls the solenoid 48 of the overflow valve 46. Such a solenoid is previously known from the U.S. Pat. No. 3,671,814. The servoclutch develops through such targeted control to a specific slip a torque of predetermined magnitude causing the engine 80 to respond with a respective speed adaptation, presently by speed reduction. During the synchronization process, a comparator 92 compares the values $n_2/n_1$ which are continuously determined by the sensors 28, 29 and, at equality with the set value, causes from the memory 90 the emission of a signal 93 which triggers Step D: "Meshing of shift detents 17, 19." This occurs through actuation of the solenoid 118. The limit switch 119 coupled with the shift device 115 indicates the limit position reached and triggers Step E: "Emptying the servoclutch 36." This occurs through opening the switch 150 causing the influx valve 50 to assume its closed position and the limit switch 152 to indicate the completion of the shifting.

The shifting operations shared by the sliding sleeves 20, 25, 59 with the not illustrated shifting devices 120, 125, 159 take place analogously.

Emergency operation (not illustrated) of the novel transmission of the invention upon failure of the control is thus possible by engaging through external intervention the sliding sleeve 15 for gear I and initiating the filling of the torque converter 6. In the case of a six-speed transmission, emergency operation might be possible also by using a higher gear after the torque converter. Starting the engine by towing is possible also when the torque converter is bridged.

While there have been described above the principles of this invention in connection with specific apparatus, it is to be clearly understood that this description is made only by way of example and not as a limitation to the scope of the invention.

What is claimed is:

1. A change spur gear assembly for a vehicle transmission which has a transmission input shaft and individual gear stages shiftable by detent clutches having sliding sleeves and deflective detents comprising:
   a starting member having a fillable and emptiable hydrodynamic circuit whose primary wheel is connected with a first layshaft and whose secondary wheel is connected with a layshaft of the change gear;
   a synchronizing device which is effective for all gears and arranged on a second layshaft for bringing the detent clutch halves to equal speed for shifting, said synchronizing device including a hydrodynamic servoclutch with variable charge and having a primary vane wheel arranged on the second layshaft and having a secondary vane wheel on an intermediate shaft and connected through a gear unit with the transmission output shaft;
   the gearing of the secondary vane wheel of the servoclutch to the transmission output shaft is so selected that the clutch can at force of flow effectuate, through the second layshaft and intermediate shaft, an output speed which is between 5 and 15 percent higher than maximum speed;
   control means which effectuates synchronism of the detent clutches participating in the shifting through which an automatic gear change is triggered in accordance with a change signal formed from momentary values of the input variables of engine capacity, transmission input speed, and transmission output speed, which changeover takes place with the following steps: filling the hydrodynamic servoclutch, disengaging the shift detent which is engaged with the present gear, adjusting the slip of the hydrodynamic servoclutch to a set value coordinated with the gear to be shifted next for the ratio of output speed to the input speed of the transmission, engaging the shift detent coordinated with the new gear, and emptying the hydrodynamic servoclutch.

2. The transmission according to claim 1 wherein the primary wheel and secondary wheel of the hydrodynamic circuit can be bridged by a clutch.

3. The transmission according to claim 1 wherein said first and second layshafts are hollow shafts, an elastic shaft being connected with the secondary wheel of the hydrodynamic circuit and extending through the hollow first layshaft while the second layshaft is an oil feeder.

4. The transmission according to claim 1 wherein the hydrodynamic servoclutch is so designed that the torque occurring on the transmission input shaft during the shift operation amounts up to 1.5 times the useful engine torque.

5. The transmission according to claim 1 wherein the input shaft and the output shaft of the transmission are arranged coaxially and can be connected through a clutch.

6. The transmission according to claim 1 wherein the shift detents are in both peripheral directions beveled on their end faces.

7. The transmission according to claim 1 wherein the hydrodynamic circuit and the servoclutch are arranged in one and the same plane.

8. The transmission according to claim 1 wherein the sliding sleeves for the gear wheel stages are arranged on the layshaft of the change gear running at high speed.

9. A change spur gear assembly for a vehicle transmission which has a transmission input shaft and individual gear stages shiftable by detent clutches having sliding sleeves and deflective detents comprising:
   a starting member having a fillable and emptiable hydrodynamic circuit whose primary wheel is connected with a first layshaft and whose secondary wheel is connected with a layshaft of the change gear;
   a synchronizing device which is effective for all gears and arranged on a second layshaft for bringing the detent clutch halves to equal speed for shifting, said synchronizing device including a hydrodynamic servoclutch with variable charge and having a primary vane wheel arranged on the second layshaft and having a secondary vane wheel on an intermediate shaft and connected through a gear unit with the transmission output shaft;
   the gearing of the secondary vane wheel of the servoclutch to the transmission output shaft is so selected that the clutch can at force of flow effectuate, through the second layshaft and intermediate shaft, an output speed which is between 5 and 15 percent higher than maximum speed;
   control means for effectuating synchronism of the detent clutches participating in the shifting through which an automatic gear change is triggered in accordance with a change signal formed from momentary values of the input variables of engine capacity, transmission input speed, and transmission output speed, which changeover takes place with the following steps: filling the hydrodynamic servoclutch, disengaging the shift detent which is engaged with the present gear, adjusting the slip of the hydrodynamic servoclutch to a set value coordinated with the gear to be shifted next for the ratio of output speed to the input speed of the transmission, engaging the shift detent coordinated with the new gear, and emptying the hydrodynamic servoclutch; and
   said control means including two speed sensors of which one scans a speed which is proportional to the transmission input speed and the other a speed which is proportional to the transmission output speed with a specific value for the ratio of output speed to input speed of the transmission being formed for each gear, in the control means, from the scanned values.

10. A change spur gear assembly for a vehicle transmission which has a transmission input shaft and individual gear stages shiftable by detent clutches having sliding sleeves and deflective detents comprising:
   a starting member having a fillable and emptiable hydrodynamic circuit whose primary wheel is connected with a first layshaft and whose secondary wheel is connected with a layshaft of the change gear;

a synchronizing device which is effective for all gears and arranged on a second layshaft for bringing the detent clutch halves to equal speed for shifting, said synchronizing device including a hydrodynamic servoclutch with variable charge and having a primary vane wheel arranged on the second layshaft and having a secondary vane wheel on an intermediate shaft and connected through a gear unit with the transmission output shaft;

the gearing of the secondary vane wheel of the servoclutch to the transmission output shaft is so selected that the clutch can at force of flow effectuate, through the second layshaft and intermediate shaft, an output speed which is between 5 and 15 percent higher than maximum speed;

control means for effectuating synchronism of the detent clutches participating in the shifting through which an automatic gear change is triggered in accordance with a change signal formed from momentary values of the input variables of engine capacity, transmission input speed, and transmission output speed, which changeover takes place with the following steps: filling the hydrodynamic servoclutch, disengaging the shift detent which is engaged with the present gear, adjusting the slip of the hydrodynamic servoclutch to a set value coordinated with the gear to be shifted next for the ratio of output speed to the input speed of the transmission, engaging the shift detent coordinated with the new gear, and emptying the hydrodynamic servoclutch; and the signal for engaging the shift detent for the next gear, originating from the control means, is released as soon as the variation of the input to output speed ratio of the transmission attained through slip adjustment of the synchronizing clutch varies approximately 2 percent from the set value for the respective gear.

11. A change spur gear assembly for a vehicle transmission which has a transmission input shaft and individual gear stages shiftable by detent clutches having sliding sleeves and deflective detects comprising:

a starting member having a fillable and emptiable hydrodynamic circuit whose primary wheel is connected with a first layshaft and whose secondary wheel is connected with a layshaft of the change gear;

a synchronizing device which is effective for all gears and arranged on a second layshaft for bringing the detent clutch halves to equal speed for shifting, said synchronizing device including a hydrodynamic servoclutch with variable charge and having a primary vane wheel arranged on the second layshaft and having a secondary vane wheel on an intermediate shaft and connected through a gear unit with the transmission output shaft;

the gearing of the secondary vane wheel of the servoclutch to the transmission output shaft is so selected that the clutch can at force of flow effectuate, through the second layshaft and intermediate shaft, an output speed which is between 5 and 15 percent higher than maximum speed;

control means for effectuating synchronism of the detent clutches participating in the shifting through which an automatic gear change is triggered in accordance with a change signal formed from momentary values of the input variables of engine capacity, transmission input speed, and transmission output speed, which changeover takes place with the following steps: filling the hydrodynamic servoclutch, disengaging the shift detent which is engaged with the present gear, adjusting the slip of the hydrodynamic servoclutch to a set value coordinated with the gear to be shifted next for the ratio of output speed to the input speed of the transmission, engaging the shift detent coordinated with the new gear, and emptying the hydrodynamic servoclutch; and said control means including a sensor for the engine output and by means of the signal so derived the command for changeover from one gear to another is shifted to absolute values for the input and/or output speed which are the higher the greater a power demand is imposed upon the engine.

12. A change spur gear assembly for a vehicle transmission which has a transmission input shaft and individual gear stages shiftable by detent clutches having sliding sleeves and deflective detents comprising:

a starting member having a fillable and emptiable hydrodynamic circuit whose primary wheel is connected with a first layshaft and whose secondary wheel is connected with a layshaft of the change gear;

a synchronizing device which is effective for all gears and arranged on a second layshaft for bringing the detent clutch halves to equal speed for shifting, said synchronizing device including a hydrodynamic servoclutch with variable charge and having a primary vane wheel arranged on the second layshaft and having a secondary vane wheel on an intermediate shaft and connected through a gear unit with the transmission output shaft;

the gearing of the secondary vane wheel of the servoclutch to the transmission output shaft is so selected that the clutch can at force of flow effectuate, through the second layshaft and intermediate shaft, an output speed which is between 5 and 15 percent higher than maximum speed;

control means for effectuating synchronism of the detent clutches participating in the shifting through which an automatic gear change is triggered in accordance with a change signal formed from momentary values of the input variables of engine capacity, transmission input speed, and transmission output speed, which changeover takes place with the following steps: filling the hydrodynamic servoclutch, disengaging the shift detent which is engaged with the present gear, adjusting the slip of the hydrodynamic servoclutch to a set value coordinated with the gear to be shifted next for the ratio of output speed to the input speed of the transmission, engaging the shift detent coordinated with the new gear, and emptying the hydrodynamic servoclutch; and said secondary vane wheel of the hydrodynamic servoclutch being provided with bores which empty tangentially on the vane profile and are directed inward toward the clutch axis, and in the fluid discharge from the synchronizing clutch there being arranged a pressure control device with the valve governing the degree of filling of the hydrodynamic servoclutch being an overflow valve which can be adjusted to various response pressures.

13. A change spur gear assembly for a vehicle transmission which has a transmission input shaft and individual gear stages shiftable by detent clutches having sliding sleeves and deflective detents comprising:

a starting member having a fillable and emptiable hydrodynamic circuit whose primary wheel is connected with a first layshaft and whose secondary wheel is connected with a layshaft of the change gear;

a synchronizing device which is effective for all gears and arranged on a second layshaft for bringing the detent clutch halves to equal speed for shifting, said synchronizing device including a hydrodynamic servoclutch with variable charge and having a primary vane wheel arranged on the second layshaft and having a secondary vane wheel on an intermediate shaft and connected through a gear unit with the transmission output shaft;

the gearing of the secondary vane wheel of the servoclutch to the transmission output shaft is so selected that the clutch can at force of flow effectuate, through the second layshaft and intermediate shaft, an output speed which is between 5 and 15 percent higher than maximum speed;

control means for effectuating synchronism of the detent clutches participating in the shifting through which an automatic gear change is triggered in accordance with a change signal formed from momentary values of the input variables of engine capacity, transmission input speed, and transmission output speed, which changeover takes place with the following steps: filling the hydrodynamic servoclutch, disengaging the shift detent which is engaged with the present gear, adjusting the slip of the hydrodynamic servoclutch to a set value coordinated with the gear to be shifted next for the ratio of output speed to the input speed of the transmission, engaging the shift detent coordinated with the new gear, and emptying the hydrodynamic servoclutch; and a hydrodynamic brake circuit integrated with the transmission having a brake rotor arranged on the shaft on which the secondary vane wheel of the synchronizing clutch is mounted.

* * * * *